US009638783B2

(12) United States Patent
Hampel et al.

(10) Patent No.: US 9,638,783 B2
(45) Date of Patent: May 2, 2017

(54) BROADCAST-BASED POSITIONING FOR DEVICE-TO-DEVICE PROXIMITY SERVICES

(71) Applicant: QUALCOMM Incorporated, San Diego, CA (US)

(72) Inventors: Georg Karl Hampel, New York, NY (US); Vincent D. Park, Budd Lake, NJ (US); Jin-Der Wang, Dublin, CA (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 709 days.

(21) Appl. No.: 14/105,087

(22) Filed: Dec. 12, 2013

(65) Prior Publication Data

US 2015/0168532 A1  Jun. 18, 2015

(51) Int. Cl.
*G01S 3/02* (2006.01)
*G01S 1/02* (2010.01)
*H04W 4/02* (2009.01)
*H04W 64/00* (2009.01)
*H04W 76/02* (2009.01)

(52) U.S. Cl.
CPC ............... *G01S 1/02* (2013.01); *H04W 4/02* (2013.01); *H04W 64/00* (2013.01); *H04W 76/023* (2013.01)

(58) Field of Classification Search
CPC .. G01S 3/02; G01S 1/02; H04W 4/02; H04W 64/00; H04W 76/023
USPC .......................................................... 342/450
See application file for complete search history.

(56) References Cited

U.S. PATENT DOCUMENTS

| 7,129,891 | B2 | 10/2006 | Meunier | |
|---|---|---|---|---|
| 2009/0017855 | A1* | 1/2009 | Kwon | H04W 76/023 455/509 |
| 2010/0254308 | A1* | 10/2010 | Laroia | H04W 8/005 370/328 |
| 2010/0260150 | A1* | 10/2010 | Aryan | G01S 5/0284 370/336 |
| 2010/0323717 | A1 | 12/2010 | Agashe et al. | |

(Continued)

OTHER PUBLICATIONS

Lin et al., an Overview on 3GPP Device-to-Device Proximity Services, Sep. 26, 2013, pp. 1-19, article located at http://arxiv.org/ftp/arxiv/papers/1310/1310.0116.pdf.

(Continued)

*Primary Examiner* — Harry Liu
(74) *Attorney, Agent, or Firm* — Holland & Hart LLP

(57) ABSTRACT

Methods, systems, and devices are described for peer-to-peer or device-to-device location services. Mobile devices with a known location (referred to as landmarks) may broadcast their location information and/or a reference signal for other mobile devices (referred to as targets). Landmarks may determine their location through GPS or other location determining means. Targets may have limited or no connection to location determining services, and they may use broadcast information from landmarks, without a request, to determine the targets' location. The targets may determine absolute and/or relative locations. Once a target device determines its location it may assume a role of a landmark to provide broadcast location information to other devices.

30 Claims, 10 Drawing Sheets

(56) References Cited

U.S. PATENT DOCUMENTS

| | | | |
|---|---|---|---|
| 2011/0055328 A1* | 3/2011 | Lahr | H04L 67/104 709/204 |
| 2012/0083285 A1* | 4/2012 | Shatsky | G01S 19/48 455/456.1 |
| 2012/0172055 A1 | 7/2012 | Edge | |
| 2012/0249372 A1* | 10/2012 | Jovicic | G01S 1/042 342/451 |
| 2013/0045751 A1 | 2/2013 | Chao et al. | |
| 2014/0173447 A1* | 6/2014 | Das | G06F 3/04842 715/738 |

OTHER PUBLICATIONS

IPEA/EPO, Second Written Opinion of the International Preliminary Examining Authority, Int'l Appl. No. PCT/US2014/067953, Dec. 7, 2015, European Patent Office, Berlin, DE, 11 pgs.

De Oliveira et al., "An Efficient Directed Localization Recursion Protocol for Wireless Sensor Networks," IEEE Transactions on Computers, Dec. 22, 2008, pp. 677-691, vol. 58, Issue 5, Institute of Electrical and Electronics Engineers.

Erol-Kantarci et al., "A Survey of Architectures and Localization Techniques for Underwater Acoustic Sensor Networks," IEEE Communications Surveys & Tutorials, Mar. 24, 2011, pp. 487-502, vol. 13, Issue 3, Institute of Electrical and Electronics Engineers.

ISA/EPO, International Search Report and Written Opinion of the International Searching Authority, Int'l Appl. No. PCT/US2014/067953, Jun. 9, 2015, European Patent Office, Rijswijk, NL, 13 pgs.

Kim et al., "MBAL: A Mobile Beacon-Assisted Localization Scheme for Wireless Sensor Networks," Proceedings of 16th International Conference on Computer Communications and Networks, ICCCN 2007, Honolulu, HI, Aug. 13-16, 2007, pp. 57-62, ISBN 978-1-4244-1251-8, Institute of Electrical and Electronics Engineers.

Xi et al, "Exploiting the Associated Information to Locate Mobile Users in Ubiquitous Computing Environment," 2011 IEEE 8th International Conference on Mobile Adhoc and Sensor Systems (MASS), Valencia, Oct. 17-22, 2011, pp. 510-519, ISBN 978-1-4577-1345-3, Institute of Electrical and Electronics Engineers.

* cited by examiner

BROADCAST-BASED POSITIONING FOR DEVICE-TO-DEVICE PROXIMITY SERVICES

BACKGROUND

The following relates generally to wireless communication, and more specifically to device-to device location services. Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

Generally, a wireless multiple-access communications system may include a number of base stations, each simultaneously supporting communication for multiple mobile devices. Base stations may communicate certain location information to a mobile device, which the mobile device may use to determine its location. Additionally, certain device-to-device proximity services may allow a mobile device to autonomously discover certain information. However, location determination based on network signals is not always reliable, for example, in indoor environments. And device-to-device proximity detection may require a device to initiate a request, such as to a network, in order to determine a location.

SUMMARY

The described features generally relate to one or more improved systems, methods, and/or apparatuses for peer-to-peer (e.g., device-to-device) discovery. Mobile devices with a known location, which may be referred to as landmarks or mobile landmarks, may broadcast their location information and/or a reference signal for use by other mobile devices, which may be referred to as targets or target devices.

Mobile landmark devices may determine their location using global positioning system (GPS) information (or with some other location determining means, such as network triangulation). The target device may have limited or no connection to a location determining service, such as GPS, because the target may be indoors, for example. The target may thus use broadcast information from one or more mobile landmarks to determine the target's location. The target may determine a location relative to a landmark or it may determine an absolute location. Once the target determines its location, it may assume a role of a mobile landmark to provide location information to other devices.

In some embodiments, a method of communicating within a wireless communications network includes receiving a broadcast comprising a reference signal from each of a plurality of mobile landmark devices, identifying location information from each of the plurality of mobile landmark devices, and determining a location based at least in part on the plurality of received reference signals and the plurality of location information.

In some embodiments, a system for wireless communication includes means for receiving a broadcast comprising a reference signal from each of a plurality of mobile landmark devices, means for identifying location information from each of the plurality of mobile landmark devices, and means for determining a location based at least in part on the plurality of received reference signals and the plurality of location information.

In some embodiments, an apparatus for wireless communication includes a processor, a memory in electronic communication with the processor, and instructions stored in the memory. The instructions may be executable by the processor to receive a broadcast comprising a reference signal from each of a plurality of mobile landmark devices, identify location information from each of the plurality of mobile landmark devices, and determine a location based at least in part on the plurality of received reference signals and the plurality of location information.

In some embodiments, a computer program product for wireless communication includes a non-transitory computer readable medium storing instructions executable by a processor to receive a broadcast comprising a reference signal from each of a plurality of mobile landmark devices, identify location information from each of the plurality of mobile landmark devices, and determine a location based at least in part on the plurality of received reference signals and the plurality of location information.

In certain example of the method, system, apparatus, and/or computer program product may also include steps for, means for, and/or instructions executable by a processor for measuring times of arrival for at least two of the plurality of received reference signals.

In certain examples of the method, system, apparatus, and/or computer program product, determining the location may include calculating a time difference of arrival based on the at least two measured times of arrival and determining the location based at least in part on the calculated time difference of arrival and the plurality of location information. Means for determining the location may include means for calculating a time difference of arrival based on the at least two measured times of arrival, and means for determining the location based at least in part on the calculated time difference of arrival and the plurality of location information. Additionally or alternatively, they may include instructions executable to calculate a time difference of arrival based on the at least two measured times of arrival, and determine the location based at least in part on the calculated time difference of arrival and the plurality of location information.

In certain examples of the method, system, apparatus, and/or computer program product, determining the location may include performing multilateration based at least in part on the at least two measured times of arrival and the identified location information for each of the plurality of mobile landmark devices. Means for determining the location may include means for performing multilateration based at least in part on the at least two measured times of arrival and the identified location information for each of the plurality of mobile landmark devices. Additionally or alternatively, they may include instructions executable to perform multilateration based at least in part on the at least two measured times of arrival and the identified location information for each of the plurality of mobile landmark devices.

In certain examples, the method, system, apparatus, and/or computer program product may also include steps for, means for, and/or instructions executable by a processor for broadcasting an outbound reference signal and information relating to location based at least in part on the determined location.

In certain examples of the method, system, apparatus, and/or computer program product, broadcasting may occur over an air interface.

In certain examples, the method, system, apparatus, and/or computer program product may also include steps for, means for, and/or instructions executable by a processor for synchronizing an internal clock based at least in part on the received plurality of reference signals or the plurality of identified location information.

In certain examples of the method, system, apparatus, and/or computer program product, at least one of the plurality of mobile landmark devices may be in an operation mode.

In certain examples of the method, system, apparatus, and/or computer program product, at least one of the plurality of mobile landmark devices may include a battery to supply power for operation.

In certain examples of the method, system, apparatus, and/or computer program product, at least one of the plurality of mobile landmark devices may be attached to an air interface.

In certain examples of the method, system, apparatus, and/or computer program product, the determined location may be an absolute location.

In certain examples of the method, system, apparatus, and/or computer program product, each of the plurality of received reference signals may include a time of transmission.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Location services are a ubiquitous component of mobile devices. While network location methods work quite well, and global navigation satellite systems (GNSS), such as GPS, may work well for determining an absolute location, these services may be limited to situations when multiple base station signals are detected or an unobstructed view of the sky is present. In order to make a low-cost terrestrial location detection service, devices with a known location (referred to as landmarks) will broadcast their location information and a reference signal with a timestamp for other mobile devices (referred to as targets). The landmark may determine its location through GPS or other location determining means, such as network triangulation. A target may have limited or no connection to location determining services, such as GPS, because the target may be indoors. The target may use the broadcast information from the landmark to determine the target's location. The target may determine a location relative to the landmark or it may determine an absolute location. Once a target device determines its location it may assume a role of a landmark to provide location information to other devices.

Landmarks may also be used as advertising device, which may provide coupons and/or other commercial incentives, to users within a certain range. A target device may receive the advertising information, which may be in the form of a proximity signal, from the landmark. The target device may determine whether to calculate a location based on the proximity signal. As used herein, peer-to-peer and device-to-device may refer generally to direct communication between two client devices (e.g., mobile devices, user equipment, phones, tablet computers, laptop computers, PDAs, watches, printers, etc.) without the need to route communications through a server or network controller (e.g., base station, eNodeB, access point, etc.).

Thus, the following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Figure 1:
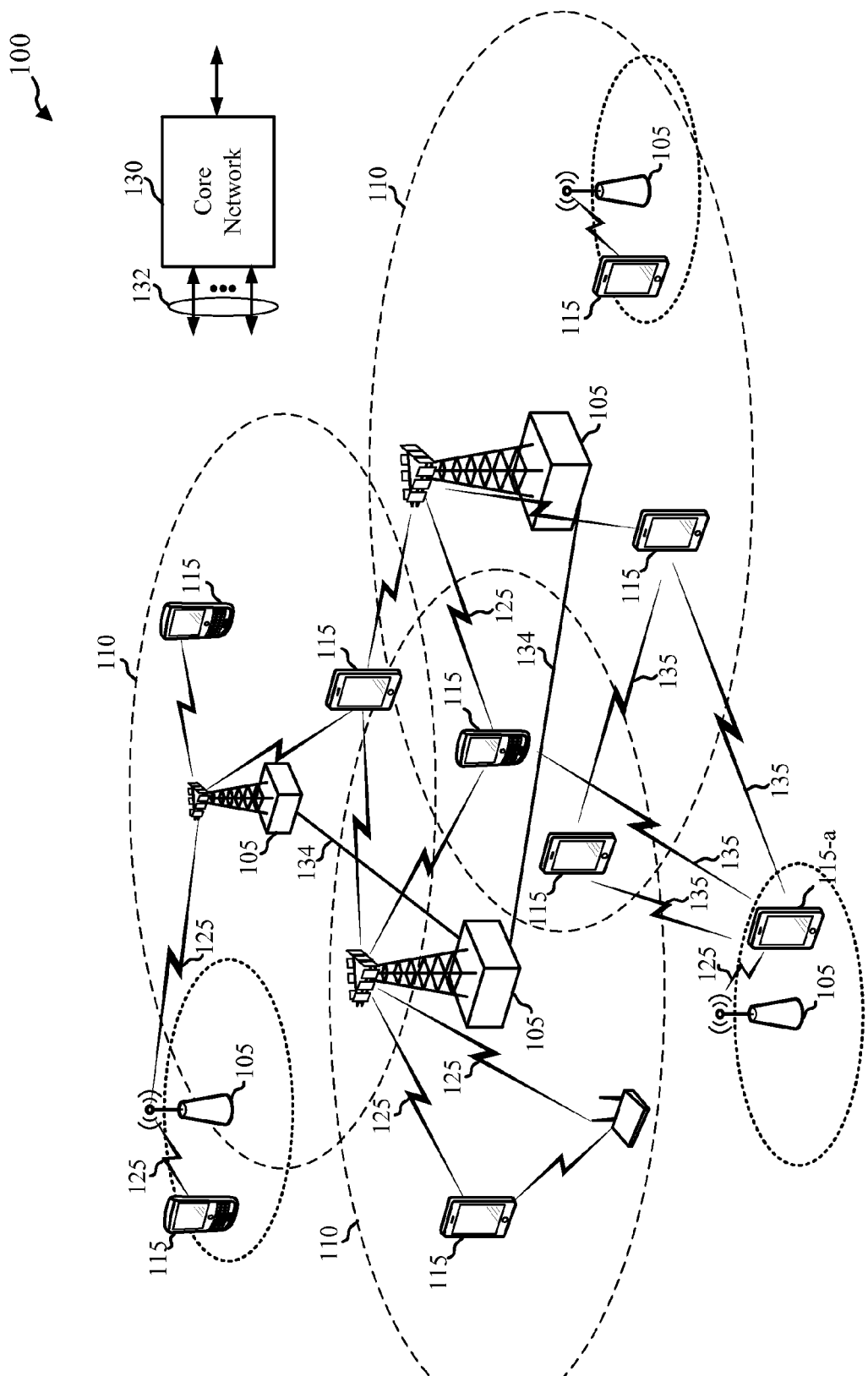
FIG. 1 shows a block diagram of a wireless communication system according to various embodiments.

Referring first to FIG. 1, a diagram illustrates an example of a wireless communications system 100. The system 100 includes base stations (or cells) 105, communication devices 115, and a core network 130. The communication devices 115 may be referred to as mobile devices, user equipment (UE), and/or stations. The base stations 105 may communicate with the communication devices 115 under the control of a base station controller (not shown), which may be part of the core network 130 or the base stations 105 in various embodiments. Base stations 105 may communicate control information and/or user data with the core network 130 through backhaul links 132. Backhaul links 132 may be wired backhaul links (e.g., copper, fiber, etc.) and/or wireless backhaul links (e.g., microwave, etc.). In some embodiments, the base stations 105 may communicate, either directly or indirectly, with each other over backhaul links 134, which may be wired or wireless communication links.

The system 100 may support operation on multiple carriers (waveform signals of different frequencies). Multi-carrier transmitters may transmit modulated signals simultaneously on the multiple carriers. For example, each communication link 125 may be a multi-carrier signal modulated according to the various radio technologies described above. Each modulated signal may be sent on a different carrier and may carry control information (e.g., reference signals, control channels, etc.), overhead information, data, etc.

The base stations 105 may wirelessly communicate with the devices 115 via one or more base station antennas. Each of the base station 105 sites may provide communication coverage for a respective coverage area 110. In some embodiments, base stations 105 may be referred to as a base transceiver station, a radio base station, an access point, a radio transceiver, a basic service set (BSS), an extended service set (ESS), a NodeB, eNodeB (eNB), Home NodeB, a Home eNodeB, or some other suitable terminology. The coverage area 110 for a base station may be divided into sectors making up only a portion of the coverage area (not shown). The system 100 may include base stations 105 of different types (e.g., macro, micro, and/or pico base stations). There may be overlapping coverage areas for different technologies.

The communication devices 115 are dispersed throughout the wireless network 100, and each device may be stationary or mobile. A communication device 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a user equipment, a mobile client, a client, or some other suitable terminology. A communication device 115 may be a cellular phone, a personal digital assistant (PDA), a wireless modem, a wireless communication device, a handheld device, a tablet computer, a laptop computer, a cordless phone, a wireless local loop (WLL) station, or the like. A communication device may be able to communicate with macro base stations, pico base stations, femto base stations, relay base stations, and the like.

The transmission links 125 shown in network 100 may include uplink (UL) transmissions from a mobile device 115 to a base station 105, and/or downlink (DL) transmissions, from a base station 105 to a mobile device 115. The downlink transmissions may also be called forward link transmissions while the uplink transmissions may also be called reverse link transmissions. The mobile devices may also be able to communicate with one another through direct peer-to-peer connections 135, such as LTE-Direct. In some cases, devices 115-a located outside of a coverage cell (or with low signal strength, or within a coverage cell that does not support location services) may communicate 135 with other mobile devices 115 to acquire information, such as network or location information.

For example, the mobile device 115-a may not be able to receive GNSS signals, such as GPS. In some cases, the mobile device 115-a cannot receive GNSS signals because it is located indoors. In various embodiments, the mobile device 115-a is unable to determine location based on network signals—for example, the device 115-a may not be able to communicate with enough base stations 105 to determine a location, or a base station 105 may not provide network-based location services. The device 115-a may, however, act as a target, and it may receive a broadcast from other devices 115 that have determined their location, such as devices that are acting as landmarks. In some cases, the mobile device 115-a is located within a distance of the landmarks that enables peer-to-peer communications. Broadcasts from the landmarks may include a reference signal. The mobile device 115-a may identify location information from the landmark devices, and it may determine its location based at least in part on the received reference signals and the determined location information.

In embodiments, the system 100 is an LTE/LTE-A network. In LTE/LTE-A networks, the terms evolved Node B (eNB) and user equipment (UE) may be generally used to describe the base stations 105 and communication devices 115, respectively. The system 100 may be a Heterogeneous LTE/LTE-A network in which different types of eNBs provide coverage for various geographical regions. For example, each eNB 105 may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells.

The communications system 100 according to an LTE/LTE-A network architecture may be referred to as an Evolved Packet System (EPS) 100. The EPS 100 may include one or more UEs 115, an Evolved UMTS Terrestrial Radio Access Network (E-UTRAN), an Evolved Packet Core (EPC) 130 (e.g., core network 130), a Home Subscriber Server (HSS), and an Operator's IP Services. The EPS may interconnect with other access networks using other Radio Access Technologies.

The E-UTRAN may include the eNBs 105 and may provide user plane and control plane protocol terminations toward the UEs 115. The eNBs 105 may be connected to other eNBs 105 via backhaul link 134 (e.g., an X2 interface, and the like). The eNBs 105 may provide an access point to the EPC 130 for the UEs 115. The eNBs 105 may be connected by backhaul link 132 (e.g., an S1 interface, and the like) to the EPC 130.

Figure 2:
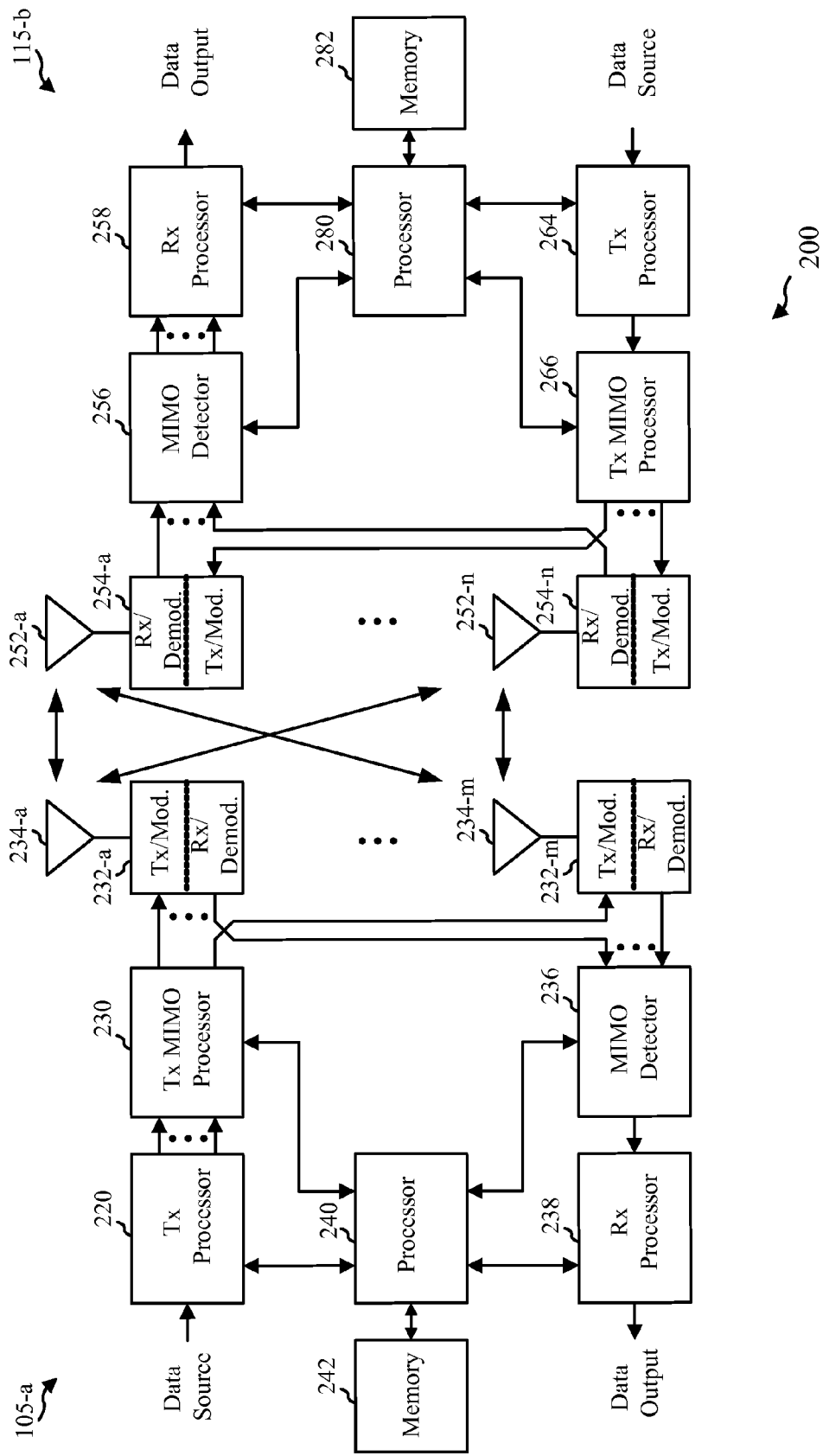
FIG. 2 shows a block diagram of an example of a multiple-input, multiple-output (MIMO) wireless communication system according to various embodiments.

FIG. 2 is a block diagram of a MIMO communication system 200 including a base station or eNB 105-a and a mobile device or UE 115-b. The base station 105-a may be an example of the base stations 105 of FIG. 1, while the mobile device 115-b may be an example of the communication devices 115 of FIG. 1. This system 200 may illustrate aspects of the system 100 of FIG. 1. The base station 105-a may be equipped with M antennas 234-a through 234-m, and the mobile device 115-b may be equipped with N antennas 252-a through 252-n. In the system 200, the base station 105-a may employ multiple antenna techniques for transmission over communication links. For example, the base station 105-a may employ transmit diversity to improve robustness of transmissions received by the mobile device 115-b. The mobile device 115-b may employ receive diversity using multiple receive antennas to combine signals received at multiple antennas.

At the base station 105-a, a transmit (Tx) processor 220 may receive data from a data source. The transmit processor 220 may process the data. The transmit processor 220 may also generate reference symbols, and a cell-specific reference signal. A transmit (Tx) MIMO processor 230 may perform spatial processing (e.g., precoding) on data symbols, control symbols, and/or reference symbols, if applicable, and may provide output symbol streams to the transmit modulators 232-a through 232-m. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink (DL) signal. In one example, DL signals from modulators 232-a through 232-m may be transmitted via the antennas 234-a through 234-m, respectively. In some cases, modulators 232-a through 232-m may transmit signals via the antennas 234-a through 234-m on both licensed frequency band as well as unlicensed frequency bands.

At the mobile device 115-b, the mobile device antennas 252-a through 252-n may receive the DL signals from the base station 105-a and may provide the received signals to the demodulators 254-a through 254-n, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254-a through 254-n, perform MIMO detection on the received symbols if applicable, and provide detected symbols. A receive (Rx) processor 258 may process (e.g., demodulate, deinterleave, and decode) the detected symbols, providing decoded data for the mobile device 115-b to a data output, and provide decoded control information to a processor 280, or memory 282. In this manner, the mobile device 115-b may receive location information from the base station 105-a. The UE 115-b may thus act as a landmark device, and it may broadcast a reference signal to UEs 115 in target mode.

On the uplink (UL), at the mobile device 115-b, a transmit (Tx) processor 264 may receive and process data from a data source or a processor 240 coupled with memory 242. The transmit processor 264 may also generate reference symbols for a reference signal. The symbols from the transmit processor 264 may be precoded by a transmit (Tx) MIMO processor 266 if applicable, further processed by the demodulators 254-a through 254-n (e.g., for SC-FDMA, etc.), and be transmitted to the base station 105-a in accordance with the transmission parameters received from the base station 105-a. At the base station 105-a, the UL signals from the mobile device 115-b may be received by the antennas 234, processed by the demodulators 232, detected by a MIMO detector 236 if applicable, and further processed by a receive (Rx) processor 238. The receive processor 238 may provide decoded data to a data output and to the processor 240.

The components of the base station 105-a may, individually or collectively, be implemented with one or more Application Specific Integrated Circuits (ASICs) adapted to perform some or all of the applicable functions in hardware. Each of the noted modules may be a means for performing one or more functions related to operation of the system 200. Similarly, the components of the mobile device 115-b may, individually or collectively, be implemented with one or more Application Specific Integrated Circuits (ASICs) adapted to perform some or all of the applicable functions in hardware. Each of the noted components may be a means for performing one or more functions related to operation of the system 200. Those skilled in the art will recognize that, while the operation of FIG. 2 is described with reference to a base station 105-a and a mobile device 115-b, similar operations and features may apply to two mobile devices 115 communicating directly. For example, two mobile devices 115 communicating via direct peer-to-peer connections 135 (FIG. 1) may employ MIMO techniques substantially as described herein.

Figure 3A:
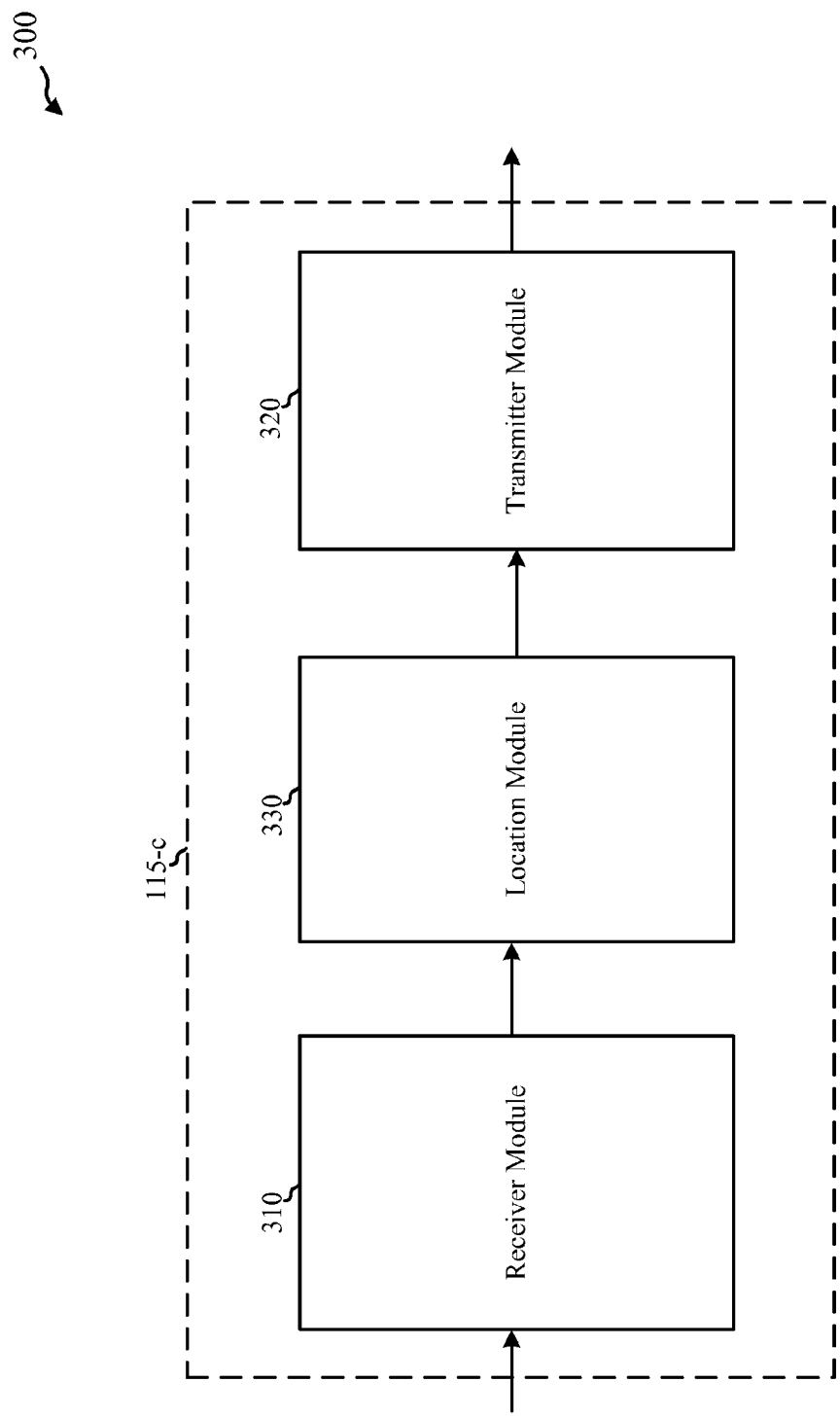
FIGS. 3A and 3B show block diagrams of a device(s) configured for wireless communication device according to various embodiments.

Turning now to FIG. 3A, which shows a block diagram 300 of a device 115-c configured for peer-to-peer or device-to-device location services, in accordance with various embodiments. The device 115-c may illustrate, for example, aspects of UEs 115 illustrated in FIG. 1 or 2. The device 115-c may include a receiver module 310, a transmitter module 320 and/or a location module 330. Each of these components may be in communication with one another. In some embodiments, the device 115-c is a processor.

The components of the device 115-c may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The device 115-c may perform, or include means for performing, the functions described herein. In some embodiments, the receiver module 310 receives signals from another mobile device or from the network. The location module 330 may process the received signals and determine a location of the mobile device 115-c based on the received signals. The location module 330 may identify location information from the received signals. In some cases, the location module 330 calculates a distance to one or more other mobile devices. The location module 330 or the transmitter module 320, or a combination of the two, may broadcast an outbound reference signal and/or information relating to location to other mobile devices.

Figure 3B:
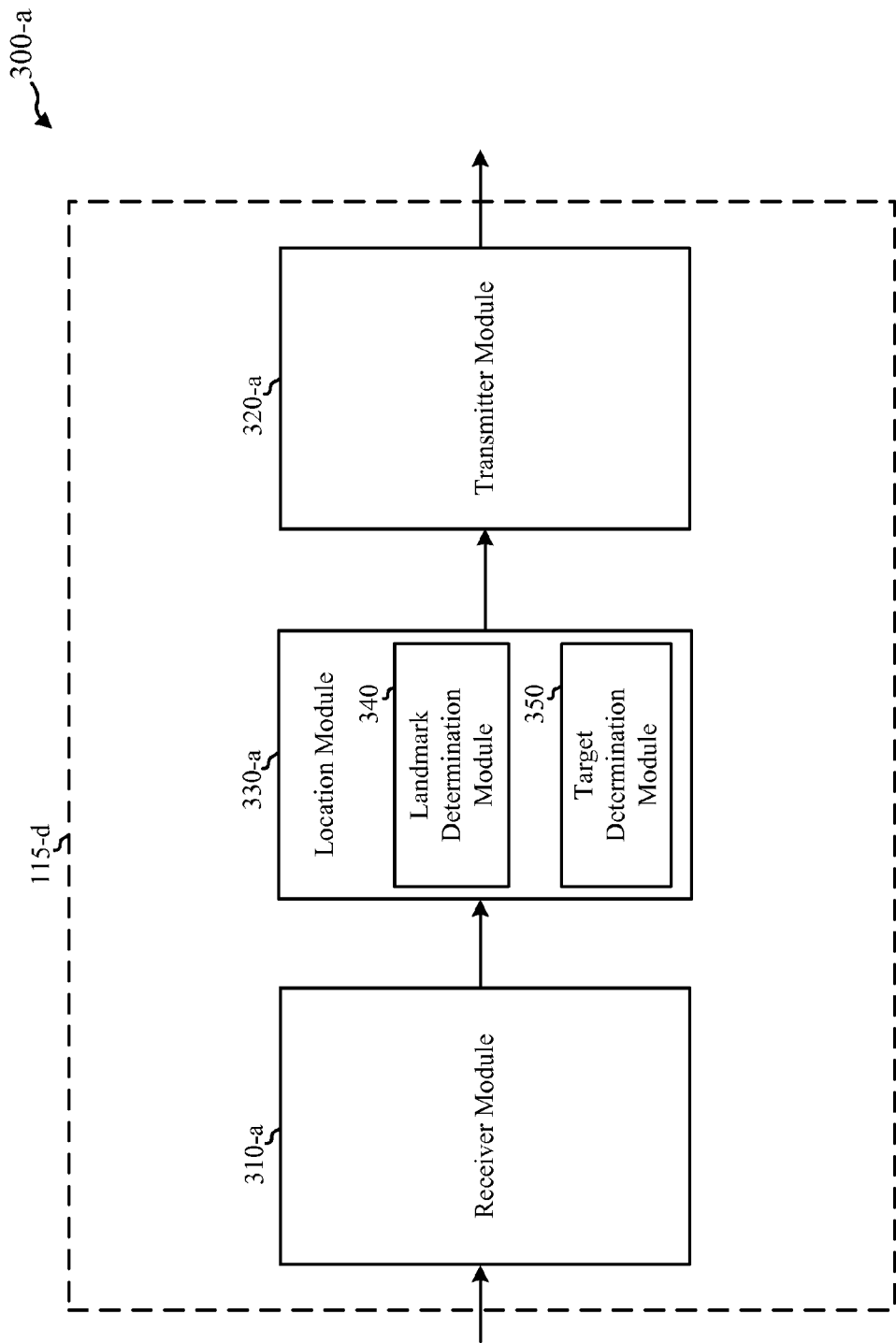

Next, FIG. 3B shows a block diagram 300-a of a device 115-d configured for peer-to-peer or device-to-device location services, in accordance with various embodiments. The device 115-d may illustrate, for example, aspects of the UEs 115 illustrated in FIGS. 1, 2, and/or 3A. The device 115-d may include a receiver module 310-a, a transmitter module 320-a, and/or a location module 330-a. Each of these components may be in communication with each other; and each may perform substantially the same functions as the corresponding modules illustrated in FIG. 3A. In some embodiments, the device 115-d is a processor.

The components of the device 115-d may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The mobile device 115-d may operate in multiple modes. In one mode, referred to as a target mode, the mobile device may attempt to determine its location based at least in part on received signals from another mobile device and/or from the network. In another mode, known as a landmark mode, the mobile device may broadcast a signal including its location so that other mobile devices, possibly in target mode, may receive the signal and determine their respective location(s) based at least in part on the received signal. The mobile device 115-d may be able to transition between a target mode and a landmark mode based on information currently available to the mobile device 115-d. In some cases, the mobile device 115-d may operate in the landmark mode or the target mode, while simultaneously acting in an operation mode, which may involve exchanging data with a network.

As such, the location module 330-a may include a landmark determination module 340 and/or a target determination module 350. The landmark determination module 340 may be configured to identify location information from received signals. In some cases, the landmark determination module 340 is configured to calculate a distance based at least in part on a received signal. The landmark determination module 340 may be configured to synchronize an internal clock based at least in part on a received signal. In various embodiments, the landmark determination module 340 is configured to determine a location based at least in part on received signals. In some cases, the determined location is an absolute location, rather than a proximity to, or location with respect to, another device or landmark. The target determination module 350 may prepare a signal, such as an outbound broadcast, with information such as a reference signal and/or information relating to the determined location of the mobile device 115-d. In some cases, the broadcast may occur over an air interface.

In some embodiments, a mobile device 115 operating in landmark mode may be used to advertise to target devices. For example, a landmark device 115 may broadcast coupons and/or other promotional material related to goods or services available at or near the landmark device 115. In some cases, a target device 115 that receives the advertising, e.g., as an aspect of a proximity signal, may perform additional operations on the signal to ascertain additional information about the advertised goods or services. For example, the target 115 may determine whether to calculate a relative or absolute location based on the advertisement from a landmark.

Figure 4:
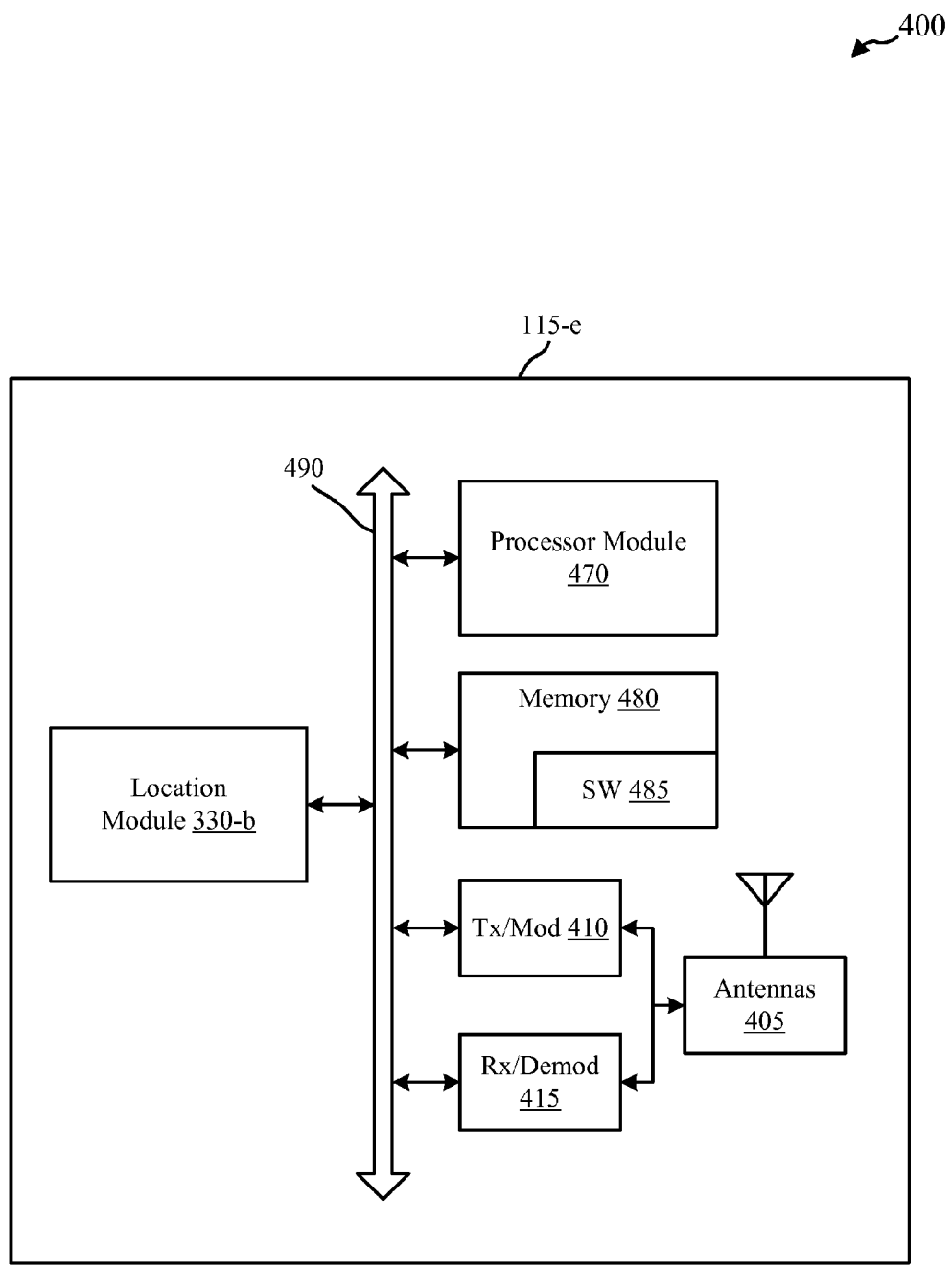
FIG. 4 shows a block diagram of an example of a mobile device configured for wireless communication according to various embodiments.

Turning now to FIG. 4, which shows a block diagram 400 of a mobile device 115-e configured for device-to-device location services, in accordance with various embodiments. The mobile device 115-e may have any of various configurations, such as personal computers (e.g., laptop computers, netbook computers, tablet computers, etc.), cellular telephones, PDAs, smartphones, digital video recorders (DVRs), internet appliances, gaming consoles, e-readers, etc. The mobile device 115-e may have an internal power supply (not shown), such as a small battery, to facilitate mobile operation. In some embodiments, the mobile device 115-e may be the mobile devices 115 of FIG. 1, 2, 3A, or 3B.

The mobile device 115-e may generally include components for bi-directional voice and data communications including components for transmitting communications and components for receiving communications. The mobile device 115-e may include an antenna(s) 405, transmitter module 410, receiver module 415, a processor module 470, and memory 480 (and software (SW) 485), which each may communicate, directly or indirectly, with each other (e.g., via one or more buses 490). The transmitter module 410 and receiver module 415 may be configured as a transceiver module, and may communicate bi-directionally, via the antenna(s) 405 and/or one or more wired or wireless links, with one or more networks, as described above. For example, the transmitter module 410 and receiver module 415 may be configured to communicate bi-directionally with base stations 105 and/or mobile devices 115 of FIG. 1 or 2. The transmitter module 410 and the receiver module 415 may be or include a modem configured to modulate the packets and provide the modulated packets to the antenna(s) 405 for transmission, and to demodulate packets received from the antenna(s) 405. While the mobile device 115-e may include a single antenna 405, the mobile device 115-e may have multiple antennas 405 capable of concurrently transmitting and/or receiving multiple wireless transmissions.

The memory 480 may include random access memory (RAM) and read-only memory (ROM). The memory 480 may store computer-readable, computer-executable software/firmware code 485 containing instructions that are configured to, when executed, cause the processor module 470 to perform various functions described herein (e.g., determining a location based on received reference signals and location information from a landmark device). Alternatively, the software/firmware code 485 may not be directly executable by the processor module 470 but be configured to cause a computer (e.g., when compiled and executed) to perform functions described herein.

The processor module 470 may include an intelligent hardware device, e.g., a central processing unit (CPU), a microcontroller, an application-specific integrated circuit (ASIC), etc. The mobile device 115-e may include a speech encoder (not shown) configured to receive audio via a microphone, convert the audio into packets (e.g., 20 ms in length, 30 ms in length, etc.) representative of the received audio, provide the audio packets to the transmitter module 410 and/or the receiver module 415, and provide indications of whether a user is speaking.

According to the architecture of FIG. 4, the mobile device 115-e may further include a location module 330-b, which may be substantially the same as the corresponding module of devices 115 of FIGS. 3A and 3B. In some cases, the location module 330-b is configured to perform the functions of the landmark determination module 340 and/or the target determination module 350 described with reference to FIG. 3B.

By way of example, the location module 330-b may be a component of the mobile device 115-e in communication with some or all of the other components of the mobile device 115-e via a bus. Alternatively, functionality of the module may be implemented as a computer program product and/or as one or more controller elements of the processor module 470.

Figure 5:
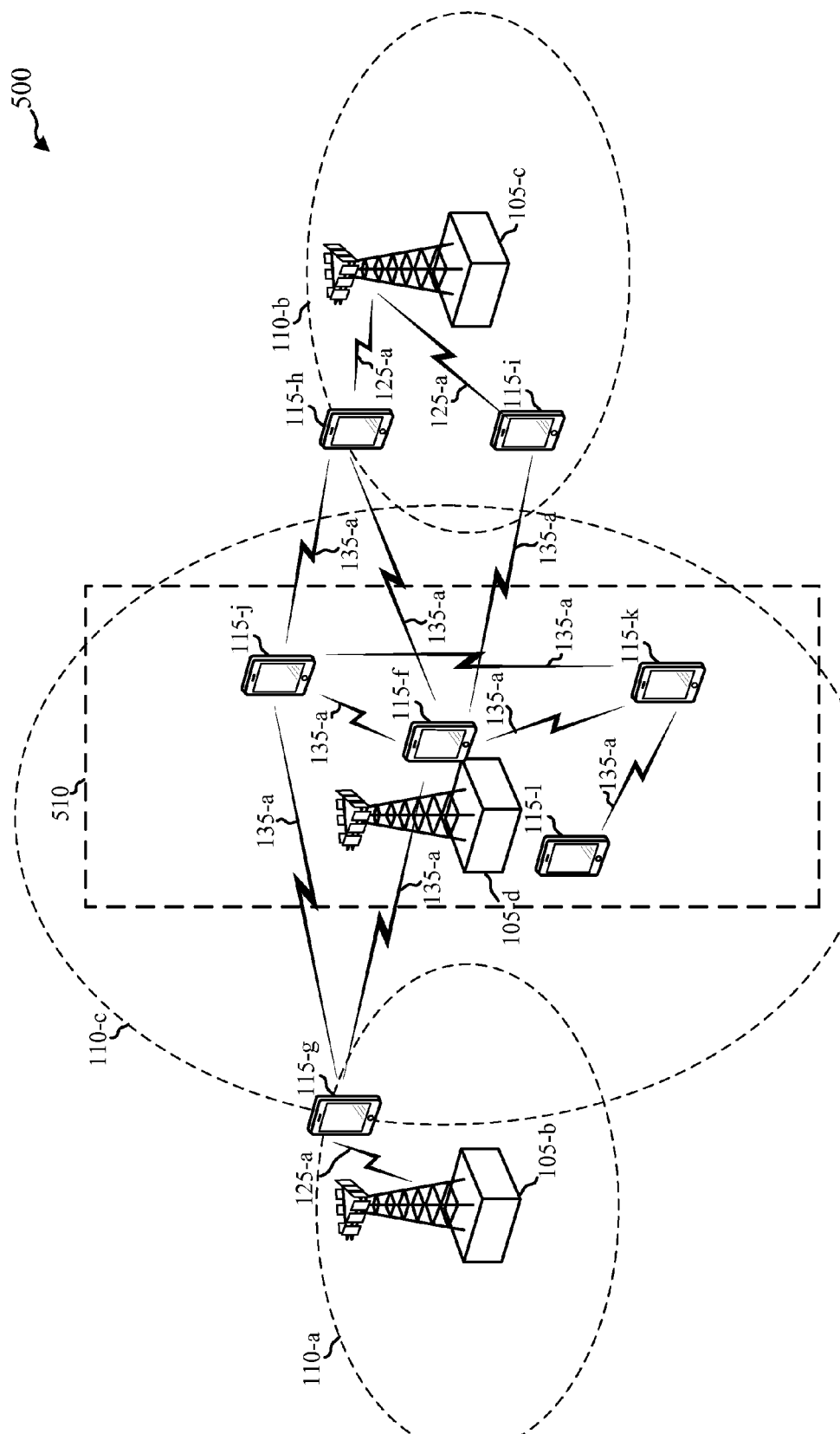
FIG. 5 shows a block diagram of a communication system according to various embodiments.

FIG. 5 illustrates an example of a wireless communications system 500 according to various embodiments. This system may include base stations 105-b, 105-c, and 105-d, mobile devices 115-f through 115-l, coverage areas 110-a, 110-b, and 110-c, transmission links 125-a, and device communication links 135-a, which may illustrate, for example, aspects of the base stations 105, mobile devices 115, coverage areas 110, transmission links 125, and device communication links 135 described with reference to FIG. 1, respectively. The system 500 further includes a dead zone 510. The dead zone 510 may be an area without, or with weak, GNSS coverage. In some cases, the dead zone 510 is an area without network coverage 110 or an area with some network coverage 110, but not enough network coverage to determine location based on network signals. The dead zone 510 may have network coverage 110-c, but the network may not provide network-based location features within the dead zone 510. In various embodiments, the dead zone 510 may be an area indoors.

The mobile devices 115-g, 115-h, and 115-i that are within the cell coverage areas 110-a and 110-b may be able to receive signals from base stations 105-b and 105-c of the network. In some cases, the mobile devices 115-g, 115-h, and 115-i outside of the dead zone 510 are able to connect with another network, such as a GPS, or location determination network. The mobile devices 115-g, 115-h, and 115-i within a coverage area 110-a or 110-b may initially be operating in a target mode. The target mobile devices 115-g, 115-h, and 115-i may communicate with the network using the transmission links 125-a. The target mobile devices 115-g, 115-h, and 115-i may receive a signal, or broadcast, from the network. In some cases, the broadcast includes a reference signal. The target mobile devices 115-g, 115-h, and 115-i may synchronize an internal clock with the received broadcast. In some cases, the target mobile devices 115-g, 115-h, and 115-i determine their location using methods, such as, time-difference-of-arrival (TDOA), network triangulation or multilateration (e.g., trilateration), and/or through global navigation satellite systems (GNSS) such as GPS.

Once the mobile devices 115-g, 115-h, and 115-i acquire their locations, they may switch from the target mode to a landmark mode. When the mobile devices 115-g, 115-h, and 115-i are in landmark mode, each device may broadcast an outbound signal. In various embodiments the mobile landmark devices may request at least one resource from the network. The broadcast may use the at least one requested resource. In some cases, the broadcast includes a reference signal and/or information related to location based at least in part on the determined location of each device. Since the information is broadcast, neighboring mobile devices may receive the broadcast without prompting mobile devices 115-g, 115-h, or 115-i. In other words, the neighboring mobile devices 115 do not need to transmit a request in order to receive the broadcast. Simply being in a target mode may be sufficient for the mobile devices 115 to receive and/or identify the broadcast.

A neighboring mobile device 115-f in a target mode may receive the broadcasts of landmark mobile devices 115-g, 115-h, and 115-i using the device communication links 135-a. In various embodiments, the target mobile device 115-f may receive network coverage 110-c, but not enough network coverage to determine location or the network 110-c may not support network-based location features. In some cases, the target mobile device 115-f needs more than one landmark mobile device to determine a location. The target mobile device 115-f may need three or more landmark mobile devices to determine a location. The target mobile device 115-f receives broadcasts from the landmark mobile devices 115-g, 115-h, and 115-i that may include a reference signal. In some cases, the broadcast further includes information relating to the location of the mobile landmark device 115-g, 115-h, or 115-i. The reference signal may include a time of transmission. The target mobile device 115-f may determine its location based at least in part on the received broadcasts from a plurality of mobile landmark devices 115-g, 115-h, and/or 115-i. In some cases, the target mobile device 115-f and/or the landmark mobile devices 115-g, 115-h, and 115-i are terrestrial devices.

The target mobile device 115-f may calculate its location via time difference of arrival (TDOA). In various embodiments, the TDOA calculation is based on time-of-arrival (TOA) measurements of the broadcasts received from the plurality of landmark mobile devices 115-g, 115-h, and 115-i. The TDOA calculation may be based on at least two TOA measurements. In some cases, the time-of-arrival measurements are conducted with respect to the target's internal clock. The TDOA calculation may include broadcast information from the landmark devices 115-g, 115-h, and 115-i such as broadcast transmission time and/or landmark location information.

In some cases, the target mobile device 115-f calculates a distance to each of the plurality of mobile landmark devices 115-g, 115-h, and 115-i. Calculating a distance to the mobile landmark devices may include calculating a time difference of arrival based at least in part on the received reference signal. In some cases, calculating a distance to the mobile landmark devices includes calculating a time of flight based at least in part on the received reference signal. Using the calculated distances to each of the mobile landmark devices 115-g, 115-h, and 115-i, the target mobile device 115 may determine its location. In some embodiments, the target mobile device 115-f determines its location by multilateration.

Upon determining its location, the target mobile device 115-f may transition from target mode to a landmark mode. Once in a landmark mode, the mobile landmark device 115-f may broadcast a reference signal and/or information relating to its determined location. It should be noted that mobile landmark devices need not be located in a coverage area 110. In some embodiments, mobile landmark devices 115 need to have a determined location. In some cases, mobile devices 115 need to have an internal clock synchronized, such as with other mobile landmark devices 115-g, 115-h, and/or 115-i and/or with a network, to act as a mobile landmark device. For example, a target mobile device 115-j may receive a broadcast from mobile landmark devices 115-g and 115-h that are currently located in a coverage area 110, as well as from a mobile landmark device 115-f that is located within the dead zone 510. In some embodiments, a target mobile device 115-k only receives broadcasts from mobile landmark devices 115-f, 115-j, and 115-l that are currently located in the dead zone 510.

Figure 6:
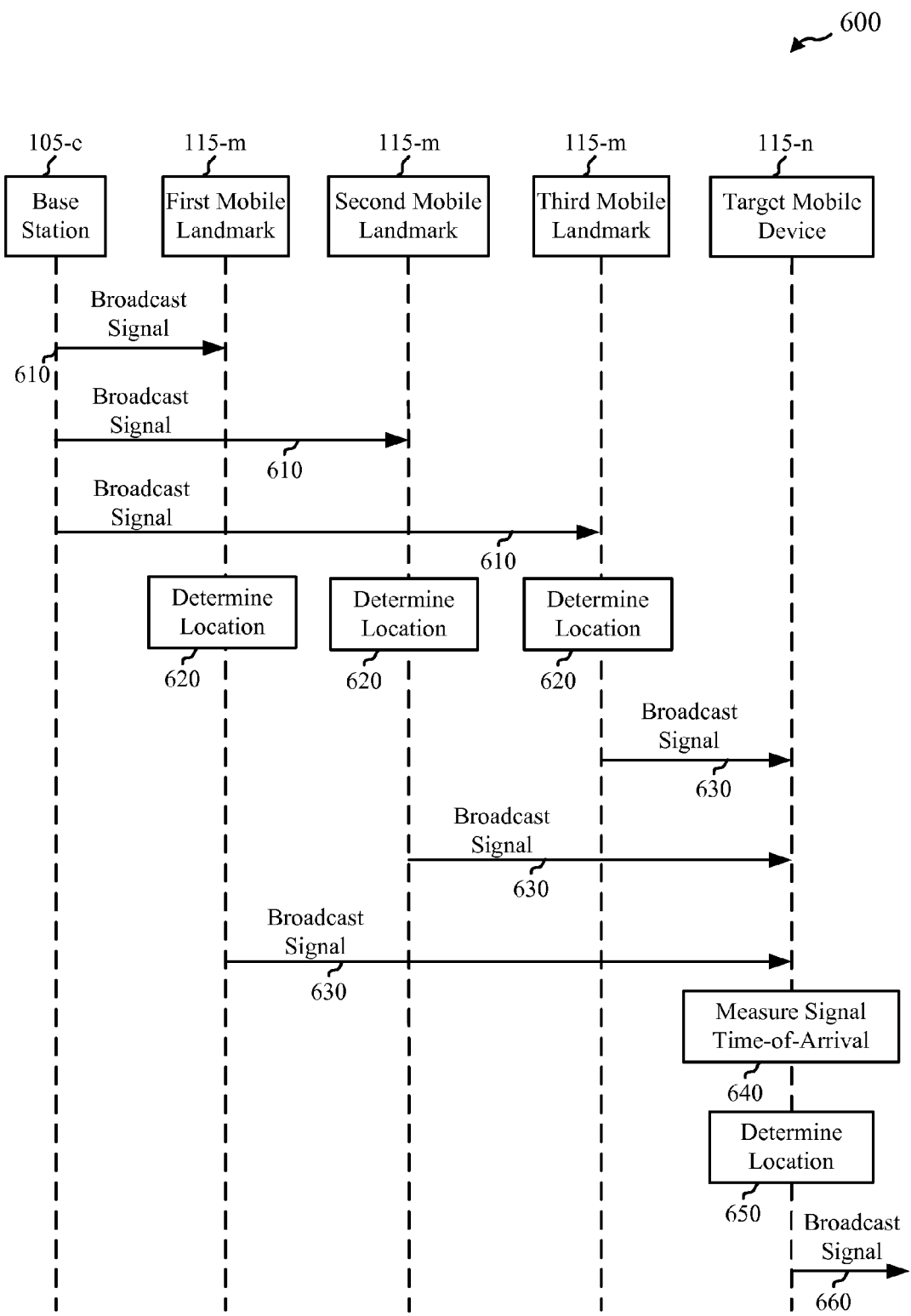
FIG. 6 is a call flow diagram of a communication system configured for wireless communication according to various embodiments.

Next, FIG. 6 is a call flow diagram illustrating a wireless communications system 600 configured for peer-to-peer, or device-to-device, location services, in accordance with various embodiments. In some embodiments, the system includes a base station 105-e which may illustrate, for example, aspects of the base stations 105 described with reference to FIGS. 1, 2, and 5. The system 600 may include mobile landmark devices 115-m and a target mobile device 115-n which may illustrate, for example, aspects of the mobile devices 115, described with reference to FIGS. 1, 2, 3A, 3B, 4, and 5.

The base station 105-e may transmit 610 a signal, such as a broadcast, including a reference signal. The mobile devices 115-m may determine 620 their locations based at least in part on the received reference signal. The mobile landmark devices 115-m may each transmit 630 a signal, such as a broadcast, including a reference signal and/or information relating to their location. The target mobile device 115-n may receive the broadcast signals and measure 640 the time-of-arrival of the reference signal with respect to an internal clock. The target mobile device 115-n may determine 650 its location through TDOA methods based at least in part on the plurality of measured time-of-arrival signals and the information relating to the location of mobile landmark devices 115-m. The target mobile device 115-n may become a mobile landmark device and transmit 660 a signal, such as a broadcast, including a reference signal and/or information relating to its location for neighboring target mobile devices to use in order to determine their location.

Figure 7:
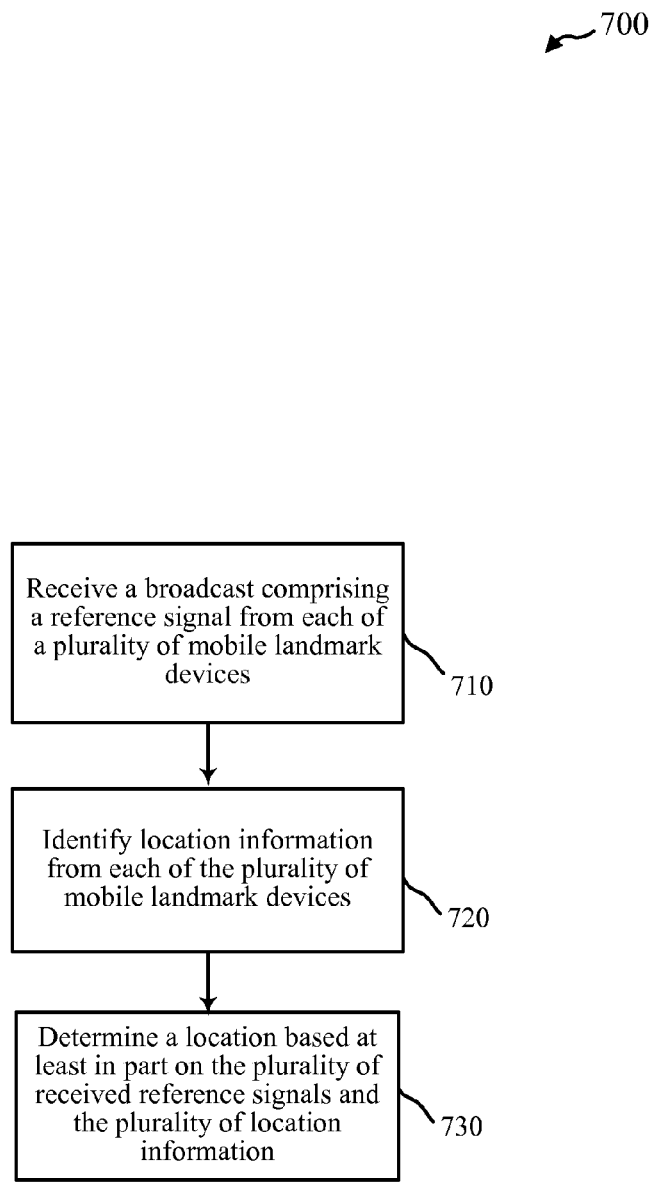
FIG. 7 is a flow diagram of a method for wireless communication according to various embodiments.

FIG. 7 depicts a flow diagram of a method 700 of communicating within a wireless communications system, in accordance with various embodiments. The method 700 may be implemented by the mobile devices 115 of FIGS. 1, 2, 3A, 3B, 4, 5, and 6.

At block 710, the method may include receiving a broadcast comprising a reference signal from each of a plurality of mobile landmark devices. The operations of block 710 are, in various embodiments, performed by the receiver module 310 of FIGS. 3A and 3B, the receiver module 415 of FIG. 4, the location module 330 of FIG. 3A, 3B, or 4 and/or the landmark determination module 340 of FIG. 3B.

In some embodiments, at least one of the plurality of mobile landmark devices is in an operation mode. Additionally or alternatively, at least one of the plurality of mobile landmark devices may comprise a battery to supply power for operation. At least one of the plurality of mobile landmark devices may be attached to an air interface. In some cases, the determined location is an absolute location. Each of the plurality of received reference signals may comprise a time of transmission.

At block 720, the method may include identifying location information from each of the plurality of mobile landmark devices. The operations of block 720 are, in various embodiments, performed by the location module 330 of FIG. 3A, 3B, or 4 and/or the landmark determination module 340 of FIG. 3B.

In some cases, at block 730, the method includes determining a location based at least in part on the plurality of received reference signals and the plurality of location information. The operations of block 730 are, in various embodiments, performed by the location module 330 of FIG. 3A, 3B, or 4, the landmark determination module 340 of FIG. 3B, and/or the target determination module 350 of FIG. 3B.

Figure 8:
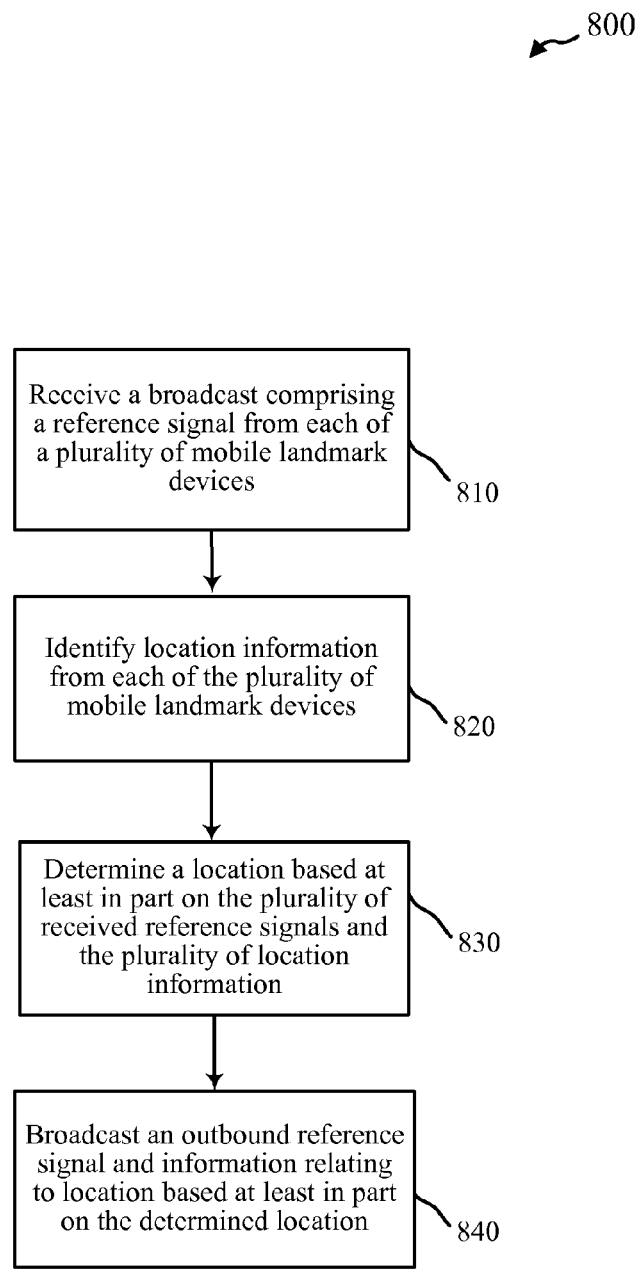
FIG. 8 is a flow diagram of a method for wireless communication according to various embodiments.

FIG. 8 depicts a flow diagram of a method 800 of communicating within a wireless communications system, in accordance with various embodiments. The method 800 may be an example of the method 700, and it may be implemented by the mobile devices 115 of FIGS. 1, 2, 3A, 3B, 4, 5, and 6.

At block 810, the method may include receiving a broadcast comprising a reference signal from each of a plurality of mobile landmark devices. The operations of block 810 are, in various embodiments, performed by the receiver module 310 of FIGS. 3A and 3B, the receiver module 415 of FIG. 4, the location module 330 of FIG. 3A, 3B, or 4 and/or the landmark determination module 340 of FIG. 3B.

At block 820, the method may include identifying location information from each of the plurality of mobile landmark devices. The operations of block 820 are, in various embodiments, performed by the location module 330 of FIG. 3A, 3B, or 4 and/or the landmark determination module 340 of FIG. 3B.

In some cases, at block 830, the method includes determining a location based at least in part on the plurality of received reference signals and the plurality of location information. The operations of block 830 are, in various embodiments, performed by the location module 330 of FIG. 3A, 3B, or 4, the landmark determination module 340 of FIG. 3B, and/or the target determination module 350 of FIG. 3B.

At block 840, the method may include broadcasting an outbound reference signal and information relating to location based at least in part on the determined location. The operations of block 840 are, in various embodiments, performed by the location module 330 of FIG. 3A, 3B, or 4, the landmark determination module 340 of FIG. 3B, the target determination module 350 of FIG. 3B, the transmitter module 320 of FIG. 3A, or 3B, and/or the transmitter module 415 of FIG. 4. In some embodiments, the broadcast occurs over an air interface.

Figure 9:
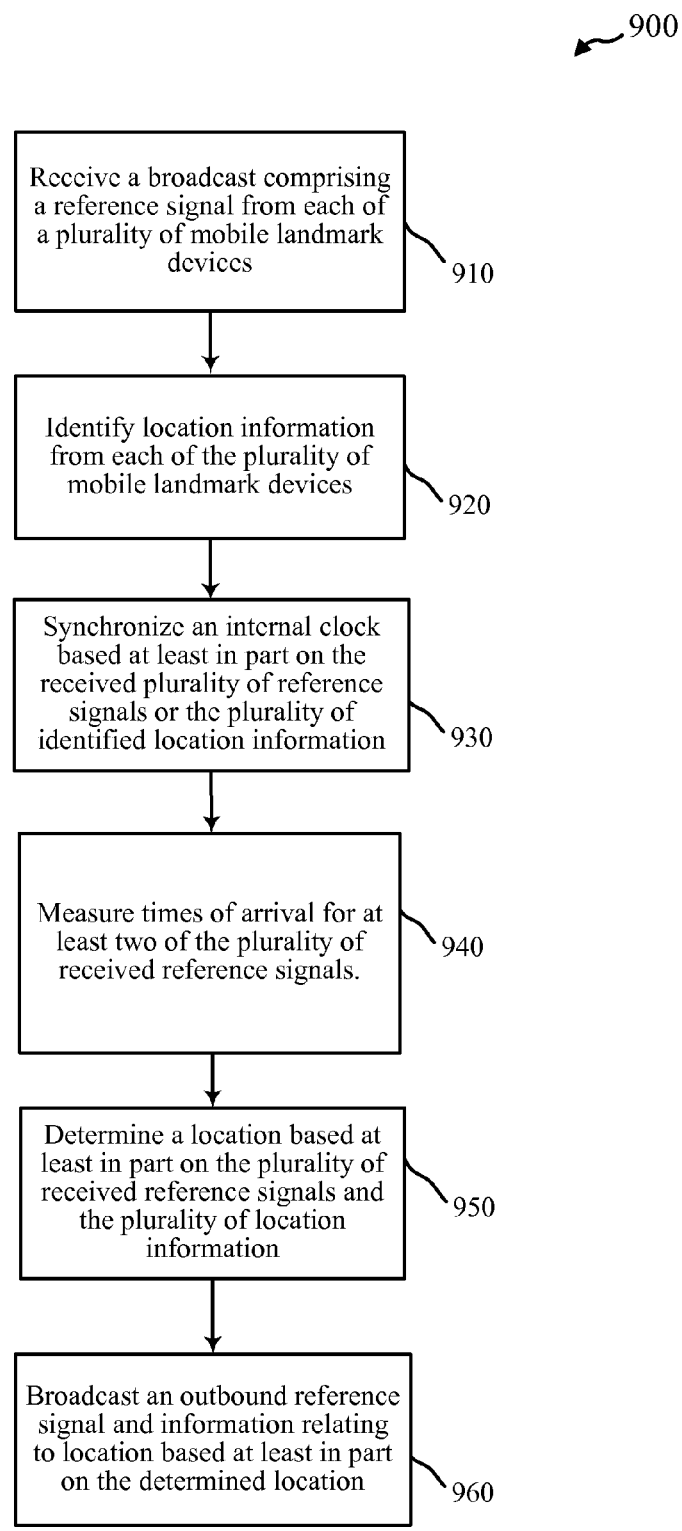
FIG. 9 is a flow diagram of a method for wireless communication according to various embodiments.

FIG. 9 depicts a flow diagram of a method 900 of communicating within a wireless communications system, in accordance with various embodiments. The method 900 may be an example of the methods 700 and/or 800, and it may be implemented by the mobile devices 115 of FIGS. 1, 2, 3A, 3B, 4, 5, and 6.

At block 910, the method may include receiving a broadcast comprising a reference signal from each of a plurality of mobile landmark devices. The operations of block 910 are, in various embodiments, performed by the receiver module 310 of FIGS. 3A and 3B, the receiver module 415 of FIG. 4, the location module 330 of FIG. 3A, 3B, or 4, and/or the landmark determination module 340 of FIG. 3B.

At block 920, the method may include identifying location information from each of the plurality of mobile landmark devices. The operations of block 920 are, in various embodiments, performed by the location module 330 of FIG. 3A, 3B, or 4 and/or the landmark determination module 340 of FIG. 3B.

In some cases, at block 930, the method includes synchronizing an internal clock based at least in part on the received plurality of reference signals or the plurality of identified location information. The operations of block 930 are, in various embodiments, performed by the location module 330 of FIG. 3A, 3B, or 4, the landmark determination module 340 of FIG. 3B, and/or the target determination module 350 of FIG. 3B.

At block 940, the method includes measuring a time of arrival for at least two of the plurality of received reference signals. The operations of block 940 are, in various embodiments, performed by the location module 330 of FIG. 3A, 3B, or 4 and/or the landmark determination module 340 of FIG. 3B.

At block 950, the method may include determining a location based at least in part on the plurality of received reference signals and the plurality of location information. The operations of block 950 are, in various embodiments, performed by the location module 330 of FIG. 3A, 3B, or 4, the landmark determination module 340 of FIG. 3B, and/or the target determination module 350 of FIG. 3B.

In some embodiments, determining the location includes calculating a time difference of arrival based on the at least two measured times of arrival and determining the location based at least in part on the calculated time difference of arrival and the plurality of location information. In some cases, determining the location involves performing triangulation and/or multilateration based at least in part on the at least two measured times of arrival and the identified location information for each of the plurality of mobile landmark devices.

At block 960, the method may include broadcasting an outbound reference signal and information relating to location based at least in part on the determined location. The operations of block 960 are, in various embodiments, performed by the location module 330 of FIG. 3A, 3B, or 4, the landmark determination module 340 of FIG. 3B, the target determination module 350 of FIG. 3B, the transmitter module 320 of FIG. 3A, or 3B, and/or the transmitter module 415 of FIG. 4.

Those skilled in the art will recognize that the methods 700, 800, and 900 are example implementations of the tools and techniques described herein. The methods may be performed with more or fewer steps; and they may be performed in an order other than indicated.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description above, however, describes an LTE system for purposes of example, and LTE terminology is used in much of the description above, although the techniques are applicable beyond LTE applications.

The detailed description set forth above in connection with the appended drawings describes exemplary embodiments and does not represent the only embodiments that may be implemented or that are within the scope of the claims. The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method of communicating within a wireless communications network, the method comprising:
   receiving, at a user equipment (UE), a broadcast comprising a reference signal from each of a plurality of mobile landmark devices;
   identifying location information from each of the plurality of mobile landmark devices; and
   determining a location of the UE based at least in part on the plurality of received reference signals and the plurality of location information.

2. The method of claim 1, further comprising:
   measuring times of arrival for at least two of the plurality of received reference signals.

3. The method of claim 2, wherein determining the location of the UE comprises:
   calculating a time difference of arrival based on the at least two measured times of arrival; and
   determining the location of the UE based at least in part on the calculated time difference of arrival and the plurality of location information.

4. The method of claim 2, wherein determining the location of the UE comprises performing multilateration based at least in part on the at least two measured times of arrival and the identified location information for each of the plurality of mobile landmark devices.

5. The method of claim 1, further comprising:
   broadcasting an outbound reference signal and information relating to location based at least in part on the determined location of the UE.

6. The method of claim 5, wherein the broadcasting occurs over an air interface.

7. The method of claim 1, further comprising:
   synchronizing an internal clock based at least in part on the received plurality of reference signals or the plurality of identified location information.

8. The method of claim 1, wherein at least one of the plurality of mobile landmark devices is in an operation mode.

9. The method of claim 1, wherein at least one of the plurality of mobile landmark devices comprises a battery to supply power for operation.

10. The method of claim 1, wherein at least one of the plurality of mobile landmark devices is attached to an air interface.

11. The method of claim 1, wherein the determined location of the UE is an absolute location.

12. The method of claim 1, wherein each of the plurality of received reference signals comprises a time of transmission.

13. A system for wireless communication, comprising:
   means for receiving, at a user equipment (UE), a broadcast comprising a reference signal from each of a plurality of mobile landmark devices;
   means for identifying location information from each of the plurality of mobile landmark devices; and
   means for determining a location of the UE based at least in part on the plurality of received reference signals and the plurality of location information.

14. The system of claim 13, further comprising:
   means for measuring times of arrival for at least two of the plurality of received reference signals.

15. The system of claim 14, wherein the means for determining the location of the UE comprises:
   means for calculating a time difference of arrival based on the at least two measured times of arrival; and
   means for determining the location of the UE based at least in part on the calculated time difference of arrival and the plurality of location information.

16. The system of claim 14, wherein the means for determining the location of the UE comprises means for performing multilateration based at least in part on the at least two measured times of arrival and the identified location information for each of the plurality of mobile landmark devices.

17. The system of claim 13, further comprising:
   means for broadcasting an outbound reference signal and information relating to location based at least in part on the determined location of the UE.

18. The system of claim 13, further comprising:
   means for synchronizing an internal clock based at least in part on the received plurality of reference signals or the plurality of identified location information.

19. The system of claim 13, wherein at least one of the plurality of mobile landmark devices is in an operation mode.

20. The system of claim 13, wherein the determined location of the UE is an absolute location.

21. The system of claim 13, wherein each of the plurality of received reference signals comprises a time of transmission.

22. An apparatus for wireless communication, comprising:
   a processor;
   a memory in electronic communication with the processor; and
   instructions stored in the memory, the instructions being executable by the processor to:
      receive, at a user equipment (UE), a broadcast comprising a reference signal from each of a plurality of mobile landmark devices;
      identify location information from each of the plurality of mobile landmark devices; and
      determine a location of the UE based at least in part on the plurality of received reference signals and the plurality of location information.

23. The apparatus of claim 22, wherein the instructions are executable by the processor to:
   measure times of arrival for at least two of the plurality of received reference signals.

24. The apparatus of claim 23, wherein the instructions to determine the location of the UE are executable by the processor to:
   calculate a time difference of arrival based on the at least two measured times of arrival; and
   determine the location of the UE based at least in part on the calculated time difference of arrival and the plurality of location information.

25. The apparatus of claim 22, wherein the instructions are executable by the processor to:
   broadcast an outbound reference signal and information relating to location based at least in part on the determined location of the UE.

26. The apparatus of claim 22, wherein the instructions are executable by the processor to:
   synchronize an internal clock based at least in part on the received plurality of reference signals or the plurality of identified location information.

27. A computer program product for wireless communication, the computer program product comprising a non-transitory computer readable medium, the computer readable medium storing instructions thereon, the instructions being executable by a processor to:
   receive, at a user equipment (UE), a broadcast comprising a reference signal from each of a plurality of mobile landmark devices;
   identify location information from each of the plurality of mobile landmark devices; and
   determine a location of the UE based at least in part on the plurality of received reference signals and the plurality of location information.

28. The computer program product of claim 27, wherein the instructions to determine the location of the UE are executable by the processor to:
   measure times of arrival for at least two of the plurality of received reference signals;
   calculate a time difference of arrival based on the at least two measured times of arrival; and
   determine the location of the UE based at least in part on the calculated time difference of arrival and the plurality of location information.

29. The computer program product of claim 27, wherein the instructions are executable by the processor to:
   broadcast an outbound reference signal and information relating to location based at least in part on the determined location of the UE.

30. The computer program product of claim 27, wherein the instructions are executable by the processor to:
   synchronize an internal clock based at least in part on the received plurality of reference signals or the plurality of identified location information.

* * * * *